United States Patent

Widdig et al.

[11] 3,914,284
[45] Oct. 21, 1975

[54] SUBSTITUTED UREIDOPHENYL THIOUREAS

[75] Inventors: Arno Widdig, Blecher; Engelbert Kuhle, Bergisch Gladbach; Klaus Sasse, Schildgen; Hans Scheinpflug, Leverkusen; Ferdinand Grewe, Burscheid; Helmut Kaspers; Paul-Ernst Frohberger, both of Leverkusen, all of Germany

[73] Assignee: Bayer Aktiengesellschaft, Leverkusen, Germany

[22] Filed: Sept. 21, 1973

[21] Appl. No.: 399,654

Related U.S. Application Data

[62] Division of Ser. No. 89,500, Nov. 13, 1970, Pat. No. 3,780,089.

[30] Foreign Application Priority Data

Nov. 29, 1969 Germany............................ 1960029

[52] U.S. Cl................................ 260/470; 424/309
[51] Int. Cl.² ........................................ C07C 157/09
[58] Field of Search.................................... 260/470

[56] References Cited
UNITED STATES PATENTS 3,780,089  12/1973  Widdig et al. ....................... 260/470

FOREIGN PATENTS OR APPLICATIONS 1,960,029  6/1971  Germany

*Primary Examiner*—John F. Terapane
*Attorney, Agent, or Firm*—Burgess, Dinklage & Sprung

[57] ABSTRACT
Ureidophenyl thioureas of the formula:

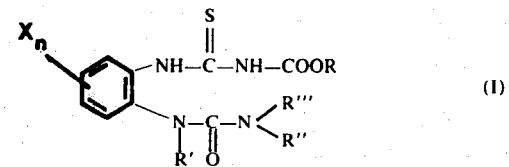

in which each X independently stands for a halogen atom, alkyl with 1–4 carbon atoms or alkoxy with 1–4 carbon atoms, $n$ stands for 0, 1 or 2, R stands for alkyl with 1–12 carbon atoms, R' and R" each stands independently for a hydrogen atom or alkyl with 1–4 carbon atoms, and R''' stands for a hydrogen atom, alkyl with 1 or 2 carbon atoms (which may carry at least one substituent selected from halogen, cyano, alkoxy with up to 4 carbon atoms and alkoxycarbonyl with up to 5 carbon atoms), alkyl with 3 to 18 carbon atoms (which carries at least one substituent selected from halogen, cyano, alkoxy with up to 4 carbon atoms and alkoxycarbonyl with up to 5 carbon atoms), cycloalkyl with 5 to 8 ring carbon atoms, aralkyl (the aryl moiety of which may carry at least one substituent selected from halogen, lower alkyl and lower alkoxy), phenyl (which may carry at least one substituent selected from halogen, lower alkyl and lower alkoxy), acyl with up to 18 carbon atoms (which may be substituted by halogen and/or lower alkyl), aroyl (which may carry at least one substituent selected from halogen, lower alkyl and lower alkoxy), alkylsulfonyl with up to 18 carbon atoms, arylsufonyl (which may carry at least one substituent selected from halogen, amino, lower alkyl and lower alkoxy) or dialkylamino with up to 4 carbon atoms, which possess fungicidial properties and which may be produced by conventional methods.

5 Claims, No Drawings

SUBSTITUTED UREIDOPHENYL THIOUREAS

This is a division, of application Ser. No. 89,500 filed Nov. 13, 1970 now U.S. Pat. 3,780,089.

The present invention relates to and has for its objects the provision of particular new ureidophenyl thioureas, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

The present invention provides ureidophenylthioureas of the general formula

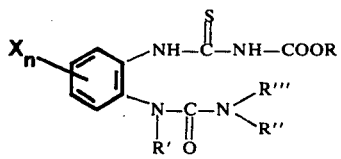

(I)

in which each X independently stands for a halogen atom, alkyl with 1–4 carbon atoms or alkoxy with 1–4 carbon atoms, n stands for 0, 1 or 2, R stands for alkyl with 1–12 carbon atoms, R' and R'' each stands independently for a hydrogen atom or alkyl with 1–4 carbon atoms and, R''' stands for a hydrogen atom, alkyl with 1 or 2 carbon atoms (which may carry at least one substituent selected from halogen, cyano, alkoxy with up to 4 carbon atoms and alkoxycarbonyl with up to 5 carbon atoms), alkyl with 3 to 18 carbon atoms (which carries at least one substituent selected from halogen, cyano, alkoxy with up to 4 carbon atoms and alkoxycarbonyl with up to 5 carbon atoms), cycloalkyl with 5 to 8 ring carbon atoms, aralkyl (the aryl moiety of which may carry at least one substituent selected from halogen, lower alkyl and lower alkoxy), phenyl (which may carry at least one substituent selected from halogen, lower alkyl and lower alkoxy), acyl with up to 18 carbon atoms (which may be substituted by halogen and/or lower alkyl), aroyl (which may carry at least one substituent selected from halogen, lower alkyl and lower alkoxy), alkylsulfonyl with up to 18 carbon atoms, arylsulfonyl (which may carry at least one substituent selected from halogen, amino, lower alkyl and lower alkoxy) or dialkylamino with up to 4 carbon atoms.

The compounds of the formula (I) have been found to exhibit strong fungicidal properties.

The invention also provides a process for the production of the ureidophenylthioureas of the formula (I) in which a 2-ureidoaniline derivative of the formula

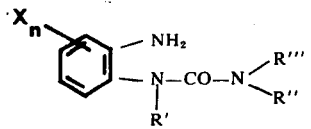

(II)

in which X, n, R', R'', and R''' have the meanings stated above, is reacted with an isothiocyanate of the formula $$S = C = N - COOR$$ 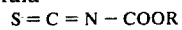

in which R has the meaning stated above, in the presence of a diluent (which term herein includes a solvent).

It is surprising that the ureidophenylthioureas of the formula (I) exhibit a higher fungicidal activity than zinc ethylene-1,2-bis-dithiocarbamate. The active compounds according to the invention therefore represent an enrichment of the art.

When N-2-aminophenyl-N'-methylurea and ethoxy carbonylisothiocyanate are used as starting materials, the reaction course can be represented by the following equation:

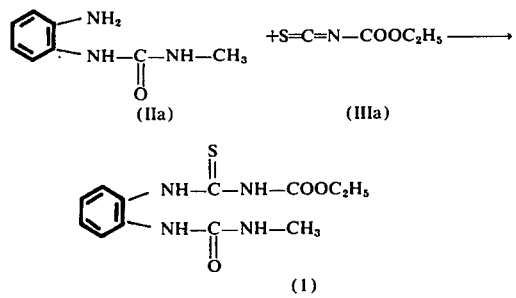

The 2-ureidoaniline derivatives used as starting materials are defined by the formula (II). In this formula, as in formula (I), X stands preferably for chlorine, bromine, fluorine, methyl, ethyl, isopropyl, n-butyl, methoxy, ethoxy or isopropoxy; n stands preferably for the numbers 0 or 1; R' and R'' stand preferably for hydrogen, methyl or ethyl, R''' stands preferably for hydrogen, alkyl iwth 1 or 2 carbon atoms, substituted alkyl with 1 to 12 carbon atoms, benzyl, phenyl, p-tolyl, p-methoxyphenyl, methoxyethyl, ethoxypropyl, cyanopentyl, acetyl, benzoyl, methanesulfonyl, p-toluenesulfonyl or dimethylamino.

As examples of the 2-ureidoaniline derivatives, there may be mentioned: 2-amino-phenylurea, N-2-aminophenyl-N'-methylurea, N-2-aminophenyl-N', N'-dimethylurea, N-2-aminophenyl-N'-O-cyanopentylurea, N-2-aminophenyl-N'-2-methoxyethylurea, N-2-aminophenyl-N'-benzylurea, N-2-aminophenyl-N'-phenylurea, N-2-aminophenyl-N'-acetylurea, N-2-aminophenyl-N'-benzoylurea, N-2-aminophenyl-N'-p-toluenesulfonylurea, 4-(2-aminophenyl)-1,1-dimethylsemicarbazide, and the like.

The 2-ureido-anilines used as starting materials are partially known (see Beilsteins Handbuch der organischen Chemie, Volume 13, pages 20–32, Berlin, 1930; Volume 13, 1. Ergänzungswerk (1st Supplement), pages 8–10, Berlin, 1933; Volume 13, 2. Ergänzungswerk (2nd Supplement), pages 14–23, Berlin-Göttingen-Heidelberg, 1950). They may also be obtained by reduction or catalytic hydrogenation of the appropriate 2-nitrophenylureas.

The isothiocyanates used as starting materials are defined by the formula (III), in which, as in formula (I), R stands preferably for methyl, ethyl or propyl. Some of the isothiocyanates are known [see J. Chem. Soc. 93, 696(1908)]; they can also be obtained from the reaction between alkali metal isothiocyanates and haloformic acid esters. Suitable isothiocyanates include methoxycarbonylisothiocyanate, ethoxycarbonylisothiocyanate and propoxycarbonylisothiocyanate.

As diluents, when carrying out the process according to the invention all inert organic solvents are suitable.

These include for example hydrocarbons, such as benzine, ligroin, hexane, benzene and toluene; chlorinated hydrocarbons, such as methylene chloride, chloroform, carbon tetrachloride and chlorobenzene; ethers, such as diethyl ether, dibutyl ether, tetrahydrofuran and dioxane; ketones, such as acetone, methylisopropyl ketone, acetophenone and cyclohexanone; and any desired mixtures of the said solvents.

The reaction temperature can be varied within a fairly wide range. In general, the work is carried out at from substantially between about −10° to 60°C, preferably from between about 0° to 40°C.

When carrying out the process according to the invention, 1 mole of isothiocyanate is preferably used per mole of the 2-ureidoaniline derivative. Amounts greater or lesser by up to 20% are possible without substantial diminution of the yield. When the reaction mixture is cooled, the end products are obtained in crystalline form and can be separated by suction filtration and, optionally, purified by redissolving or recrystallization. A preferred embodiment of the process comprises preparing the isothiocyanate in an inert solvent and reacting it directly, without further isolation, with the o-phenylenediamine derivative.

The active compounds according to the invention exhibit a strong fungitoxic activity. In the concentrations necessary for the control of fungi, they do not damage cultivated plants, and have a low toxicity to warm-blooded animals. For these reasons, they are suitable as crop protection agents for the control of fungi. Fungitoxic agents in crop protection are used for the control of Archimycetes, Phycomycetes, Ascomycetes, Basidiomycetes and *Fungi Imperfecti*.

The active compounds according to the invention have a very broad activity spectrum and can be applied against parasitic fungi which infect above-the-soil parts of plants or attack the plants from the soil, as well as against seedborne pathogenic agents.

They are particularly effective against fungi which cause powdery mildew diseases. To this group of fungi there belong predominantly representatives from the Brysiphaceae family with the most important genera being Erysiphe, Uncinula (Oidium), Sphaerotheca and Podosphaera. Important fungi include *Erysiphe cichoracearum, Podosphaera leucotricha* and *Uncinula necator*.

The active compounds according to the invention also give good results in the control of rice diseases. Thus, they show an excellent activity against the fungi *Piricularia oryzae* and *Pellicularia sasakii*, by reason of which they can be used for the joint control of these two diseases. This means a substantial advance, since, up to now, agents of different chemical constitution were required against these two fungi. Ssurprisingly, the active compounds show not only a protective activity, but also a curative and systemic effect.

The compounds according to the invention, however, also act against other fungi which infect rice or other cultivated plants, such as *Cohliobolus myiabeanus, Mycosphaerella musicola, Corcospora personata, Botrytis cinerea*, Alternaria species, *verticillium alboatrum, Phialophora cinerescens* and Fusarium species, as well as against bacterium *Xanthomonas oryzae*.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the acitve compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpsose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 2–90%, by weight of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.0001–95%, and preferably 0.01–95%, by weight of the mixture.

In the case of use as seed dressings, applied amounts of 0.1 to 10 g, preferably 0.2 to 2g, of active compound per kg of seed are suitable.

In the case of use as soil-treatment agents, applied amounts of 1 to 500 g, preferably 10 to 200 g per cubic meter of soil are usually necessary.

The active compounds according to the invention also show an insecticidal and acaricidal activity as well as an activity against some mold fungi and yeasts. In concentration higher than those necessary for fungicidal activity, the substances inhibit plant growth.

The active compound can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few Liters/Hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95% by weight of the active compound, or even the 100% active substance alone, e.g. about 20–100% by weight of the active compound.

In particular, the present invention contemplates methods of selectively killing, combating or controlling fungi, which comprises applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by squirting, spraying, atomizing, vaporizing, scattering, dusting, fumigation, watering, sprinkling, pouring, dressing, incrustations, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following Examples.

EXAMPLE 1

Erysiphe test

Solvent: 4.7 parts by weight acetone
Emulsifier: 0.3 parts by weight alkylaryl polyglycol ether
Water: 95.0 parts by weight The amount of the active compound required for the desired concentration of active compound in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23°–24°C and at a relative atmospheric humidity of about 75%.

After 12 days, the infection of the cucumber plants is determined as a percentage of the untreated but also inoculated control plants. 0% means no infection; 100% that the infection is exactly as great as in the case of the control plants.

The active compounds, the concentrations of the active compounds and the results obtained can be seen from the following Table 1.

Table 1

| | *Erysiphe* test | |
|---|---|---|
| Active compound | Infection as a percentage of the infection of the untreated control with a concentration of active compound of | |
| | 0.025% | 0.0062% |
| (A) [dithiocarbamate Zn complex] (known) | 100 | 100 |
| (1) [phenyl-NH-C(S)-NH-COOC$_2$H$_5$ / NH-C(O)-NH-CH$_3$] | 0 | 37 |
| (2) [phenyl-NH-C(S)-NH-COOC$_2$H$_5$ / NH-C(O)-NH-N(CH$_3$)$_2$] | 0 | 43 |

Table 1 —Continued

| Active compound | *Erysiphe* test Infection as a percentage of the infection of the untreated control with a concentration of active compound of | |
|---|---|---|
| | 0.025% | 0.0062% |
| (3) ![structure: phenyl-NH-C(S)-NH-COOC₂H₅ and NH-C(O)-NH-(CH₂)₅-CN] | 0 | 37 |
| (4) ![structure: phenyl-NH-C(S)-NH-COOC₂H₅ and NH-C(O)-NH-CH₂-phenyl] | | 37 |
| (5) ![structure: phenyl-NH-C(S)-NH-COOC₂H₅ and NH-C(O)-NH-phenyl] | | 33 |
| (6) ![structure: phenyl-NH-C(S)-NH-COOC₂H₅ and NH-C(O)-NH-CH₂-CH₂-O-CH₃] | | 40 |

EXAMPLE 2

Piricularia and Pellicularia Test

Solvent: 4 parts by weight acetone
Dispersing agent: 0.05 parts by weight sodium oleate
Water: 95.75 parts by weight
Other additives: 0.2 parts by weight gelatin The amount of active compound required for the desired concentration of active compound in the spray liquor is mixed with the stated amount of solvent, and the concentrate is diluted with the stated amount of water containing the stated additives.

Two batches each consisting of 30 rice plants about 2–4 weeks old are sprayed with the spray liquor until dripping wet. The plants remain in a greenhouse at temperatures of 22° to 24°C and a relative atmospheric humidity of about 70% until they are dry. One batch of the plants is then inoculated with an aqueous suspension of 100,000 to 200,000 spores/ml of *Piricularia oryzae* and placed in a chamber at 24°–26°C and 100% relative atmospheric humidity. The other batch of the plants is infected with a culture of *Pellicularia sasakii* grown on malt agar and placed at 28°–30°C and 100% relative atmospheric humidity.

5 to 8 Days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0% means no infection; 100% means that the infection is exactly as great in the case of the control plants.

The active compounds, the concentrations of the active compounds and the results obtained can be seen from the following Table 2.

Table 2

| | *Piricularia* (a) - and *Pellicularia* (b) Test pr. = protective  cur. = curative | | | | |
|---|---|---|---|---|---|
| Active compound | | Infection as a percentage of the infection of the untreated control with a concentration of active compound (in %) of | | | |
| | | a | | b | |
| | | 0.05 | 0.025 | 0.05 | 0.025 |
| (A) ![structure: CH₂-NH-CS-S-Zn-S-CS-NH-CH₂] (known) | pr. 26 cur. 100 | 75 | 25 | 100 | |
| (4) ![structure: phenyl-NH-C(S)-NH-COOC₂H₅ and NH-C(O)-NH-CH₂-phenyl] | pr. 0 | | 0 | | |

Table 2—Continued

*Piricularia* (a) - and *Pellicularia* (b) Test
pr. = protective   cur. = curative

| Active compound | | Infection as a percentage of the infection of the untreated control with a concentration of active compound (in %) of | | | |
|---|---|---|---|---|---|
| | | a | | b | |
| | | 0.05 | 0.025 | 0.05 | 0.025 |
| (5) phenyl–NH–C(=S)–NH–COOC$_2$H$_5$ / NH–C(=O)–NH–phenyl | pr. | 0 | | 0 | |
| (6) phenyl–NH–C(=S)–NH–COOC$_2$H$_5$ / NH–C(=O)–NH–CH$_2$–CH$_2$–O–CH$_3$ | pr. | 0 | | 0 | |
| (1) phenyl–NH–C(=S)–NH–COOC$_2$H$_5$ / NH–C(=O)–NH–CH$_3$ | pr. | 0 | 0 | | 25 |
| (2) phenyl–NH–C(=S)–NH–COOC$_2$H$_5$ / NH–C(=O)–NH–N(CH$_3$)$_2$ | pr. | 0 | | | 25 |
| (3) phenyl–NH–C(=S)–NH–COOC$_2$H$_5$ / NH–C(=O)–NH–(CH$_2$)$_5$–CN | pr. | 0 | | | 25 |

EXAMPLE 3

Seed dressing test/bunt of wheat
(seed-born mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia caries* pe kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 3:

Table 3

| Active compound | Seed dressing test/bunt of wheat Concentration of active compound in dressing in % by weight | Amount of dressing applied in g/kg seed | Spore Germination in % |
|---|---|---|---|
| non-dressed | — | — | >10 |
| (A) [CH$_2$–NH–CS–S / CH$_2$–NH–CS–S]Zn (known) | 10 | 1 | 5 |
| (4) phenyl–NH–C(=S)–NH–COOC$_2$H$_5$ / NH–C(=O)–NH–CH$_2$–phenyl | 30 | 1 | 0.5 |

Table 3 — Continued

| Active compound | Seed dressing test/bunt of wheat Concentration of active compound in dressing in % by weight | Amount of dressing applied in g/kg seed | Spore Germ- ination in % |
|---|---|---|---|
| (5) ⌬—NH—C(=S)—NH—COOC$_2$H$_5$ / —NH—C(=O)—NH—⌬ | 10<br>30 | 1<br>1 | 0.05<br>0.005 |
| (6) ⌬—NH—C(=S)—NH—COOC$_2$H$_5$ / —NH—C(=O)—NH—CH$_2$—CH$_2$—O—CH$_3$ | 10<br>30 | 1<br>1 | 0.05<br>0.000 |
| (1) ⌬—NH—C(=S)—NH—COOC$_2$H$_5$ / —NH—C(=O)—NH—CH$_3$ | 30 | 1 | 0.05 |
| (2) ⌬—NH—C(=S)—NH—COOC$_2$H$_5$ / —NH—C(=O)—NH—N(CH$_3$)$_2$ | 30 | 1 | 0.000 |
| (3) ⌬—NH—C(=S)—NH—COOC$_2$H$_5$ / —NH—C(=O)—NH—(CH$_2$)$_5$—CN | 30 | 1 | 0.05 |

EXAMPLE 4

Mycellium growth test

Nutrient substrate used:
20 parts by weight agar-agar (powdered)
30 parts by weight malt extract
950 parts by weight distilled water
Proportion of solvent to nutrient substrate:
2 parts by weight acetone
100 parts by weight agar nutrient substrate The amount of active compound required for the desired concentration of active compound in the nutrient substrate is mixed with the stated amount of solvent. The concentrate is thoroughly mixed in the stated proportion with the liquid nutrient substrate (which has been cooled to 42°C) and poured into Petri dishes with a diameter of 9 cm. Control plates without admixture of the preparation are also set up.

When the nutrient substrate is cold and solid, the plates are inoculated with the species of fungi stated in the Table and incubated at about 21°C.

Evaluation takes place after 4–10 days, according to the speed of growth of the fungi. In the evaluation, the radial growth of mycellium on the treated nutrient substrates is compared with the growth on the control nutrient substrate. The evaluation is effected with the following index numbers:

0 no growth of fungus
1 very strong inhibition of growth
2 moderate inhibition of growth
3 slight inhibition of growth
4 growth equal to untreated control The active compounds, concentrations of active compounds and the results obtained can be seen from the following Table 4:

Table 4

| Active compound | Mycelium growth test Concentration of active com- pound in ppm | Pellicularia sasakii | Verticillium albo-atrum | FUNGI Phialophora cinerescens | Cercospora musae | Piricularia oryzae |
|---|---|---|---|---|---|---|
| (A) CH$_2$—NH—CS—S\ Zn / CH$_2$—NH—CS—S (known) | 10 | 4 | 3 | 4 | 3 | 4 |

Table 4—Continued

| Active compound | Concentration of active compound in ppm | Mycelium growth test |  | FUNGI |  |  |
|---|---|---|---|---|---|---|
|  |  | Pellicularia sasakii | Verticillium albo-atrum | Phialophora cinerescens | Cercospora musae | Piricularia oryzae |
| (4) Ph–NH–C(S)–NH–COOC$_2$H$_5$ / NH–C(O)–NH–CH$_2$–Ph | 10 | 0 | 2 | 0 | — | 0 |
| (6) Ph–NH–C(S)–NH–COOC$_2$H$_5$ / NH–C(O)–NH–CH$_2$–CH$_2$–O–CH$_3$ | 10 | 0 | 0 | 0 | — | 0 |
| (1) Ph–NH–C(S)–NH–COOC$_2$H$_5$ / NH–C(O)–NH–CH$_3$ | 10 | — | 0 | 0 | 0 | 0 |
| (2) Ph–NH–C(S)–NH–COOC$_2$H$_5$ / NH–C(O)–NH–N(CH$_3$)$_2$ | 10 | — | 1 | 0 | 0 |  |
| (3) Ph–NH–C(S)–NH–COOC$_2$H$_5$ / NH–C(O)–NH–(CH$_2$)$_5$–CN | 10 | — | 1 | 0 | 0 |  |
| (5) Ph–NH–C(S)–NH–COOC$_2$H$_5$ / NH–C(O)–NH–Ph | 10 | 0 | 0 | 0 | — | 0 |

EXAMPLE 5

Soil treating agent test/soil-borne mycoses

To produce a suitable preparation of the active compound, the active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 Weeks after sowing, the number of healthy plants is determined as a percentage of the number of seeds sown. 0% means that no healthy plants have grown; 100% means that healthy plants have resulted from all the seeds.

The active compounds, the concentrations of the active compounds in the soil, the test fungi, host plants, greenhouse temperatures and the results obtained can be seen from the following Table 5:

Table 5

Soil treating agent test/soil-borne mycoses

| Active compound | Concentration of active compound mg/liter soil | Test fungi: Fusarium culmorum Host plant: Pea Temperature range: 22–25° |
|---|---|---|
| Fruhstorfer standard soil, sterilized untreated | — | 90 |
| Fruhstorfer standard soil, sterilized and inoculated untreated | — | 5 |
| (A) CH$_2$–NH–CS–S\ / CH$_2$–NH–CS–S / Zn (known) | 100 | 2 |

Table 5 — Continued

Soil treating agent test/soil-borne mycoses

| Active compound | | Concentration of active compound mg/liter soil | Test fungi: *Fusarium culmorum* Host plant: Pea Temperature range: 22–25° |
|---|---|---|---|
| (1) | phenyl–NH–C(=S)–NH–COOC$_2$H$_5$ ; –NH–C(=O)–NH–CH$_3$ | 100 | 60 |
| (2) | phenyl–NH–C(=S)–NH–COOC$_2$H$_5$ ; –NH–C(=O)–NH–N(CH$_3$)$_2$ | 100 | 70 |
| (3) | phenyl–NH–C(=S)–NH–COOC$_2$H$_5$ ; –NH–C(=C)–NH–(CH$_2$)$_3$–CN | 100 | 20 |

EXAMPLE 6

Erysiphe test/systemic

Solvent: 4.7 parts by weight acetone
Emulsifier: 0.3 parts by weight alkylaryl polyglycol ether
Water: 95 parts by weight The amount of the active compound required for the desired concentration in the liquid to be used for watering is mixed with the stated amount of the solvent, and the concentrate is diluted with the stated amount of water containing the stated additions.

Cucumber plants grown in standard soil are, in the one- to two-leaf stage, watered three times in 1 week with 20 cc of the liquid to be used for watering, in the stated concentration of active compound with reference to 100 cc of soil.

The plants so treated are, after the treatment, inoculated with conidia of the fungus *Erysiphe cichoracearum*. The plants are subsequently placed in a greenhouse at 23°–24°C and at a relative atmospheric humidity of 70%.

After 12 days, the infection of the cucumber plants is determined as a percentage of the untreated but also inoculated control plants. 0% Means no infection; 100% means that the infection is exactly as great as in the case of the control plants.

The active compounds, the concentrations of the active compounds and the results obtained can be seen from the following Table 6:

Table 6

*Erysiphe* test/Systemic

| Active compound | | Infection as a percentage of the infection of the untreated control with a concentration of active compound of 120 ppm |
|---|---|---|
| (A) (known) | [CH$_2$–NH–C(=S)–S ; CH$_2$–NH–C(=S)–S]Zn | 100 |
| (6) | phenyl–NH–C(=S)–NH–COOC$_2$H$_5$ ; –NH–C(=O)–NH–CH$_2$–CH$_2$–O–CH$_3$ | 0 |
| (1) | phenyl–NH–C(=S)–NH–COOC$_2$H$_5$ ; –NH–C(=O)–NH–CH$_3$ | 0 |

Table 6—Continued

| Active compound | *Erysiphe* test/Systemic Infection as a percentage of the infection of the untreated control with a concentration of active compound of 120 ppm |
|---|---|
| (2) Ph(NH—C(=S)—NH—COOC$_2$H$_5$)(NH—C(=O)—NH—N(CH$_3$)$_2$) | 0 |
| (3) Ph(NH—C(=S)—NH—COOC$_2$H$_5$)(NH—C(=O)—NH—(CH$_2$)$_5$—CN) | 13 |

EXAMPLE 7

Podosphaera test (powdery mildew of apples)
[Protective]

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the four to six leaf stage are sprayed with the spray liquid until dripping wet. The plants remain in a greenhouse for 24 hours at 20°C and at a relative atmospheric humidity of 70%. They are then inoculated by dusting with conidia of the apple powdery mildew causative organism (*Podosphaera leucotricha* Salm.) and placed in a greenhouse at a temperature of 21°–23°C and at a relative atmospheric humidity of about 70%.

Ten days after the inoculation, the infestation of the seedlings is determined as a percentage of the untreated but also inoculated control plants.

0% Means no infestation; 100% means that the infestation is exactly as great as in the case of the control plants.

The active compounds, the concentrations of the active compounds and the results obtained can be seen from the following Table 7

Table 7

| Active compound | *Podosphaera* test/Protective Infection as a percentage of the infection of the untreated control with a concentration of active compound of | |
|---|---|---|
| | 0.0062% | 0.00156% |
| (A) Zn[S—C(=S)—NH—CH$_2$—CH$_2$—NH—C(=S)—S] (known) | 44 | 100 |
| (4) Ph(NH—C(=S)—NH—COOC$_2$H$_5$)(NH—C(=O)—NH—CH$_2$—Ph) | 6 | 19 |
| (5) Ph(NH—C(=S)—NH—COOC$_2$H$_5$)(NH—C(=O)—NH—Ph) | 0 | 3 |
| (6) Ph(NH—C(=S)—NH—COOC$_2$H$_5$)(NH—C(=O)—NH—CH$_2$—CH$_2$—O—CH$_3$) | 9 | 20 |

Table 7 — Continued

| Active compound | *Podosphaera* test/Protective Infection as a percentage of the infection of the untreated control with a concentration of active compound of | |
|---|---|---|
| | 0.0062% | 0.00156% |
| (1) ⌬—NH—C(=S)—NH—COOC$_2$H$_5$ / NH—C(=O)—NH—CH$_3$ | 0 | 5 |
| (2) ⌬—NH—C(=S)—NH—COOC$_2$H$_5$ / NH—C(=O)—NH—N(CH$_3$)$_2$ | 13 | 29 |
| (3) ⌬—NH—C(=S)—NH—COOC$_2$H$_5$ / NH—C(=O)—NH—(CH$_2$)$_5$—CN | 1 | 18 |

EXAMPLE 8

Podosphaera test (systemic)

Solvent: 4.7 parts by weight acetone
Dispersing agent: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the three to four leaf stage, watered once in 1 week with 20 cc of the liquid to be used for watering, in the stated concentration of active compound, with reference to 100cc of soil. The plants so treated are, after the treatment, inoculated with conidia of *Podosphaera leucotricha* Salm and placed in a greenhouse at a temperature of 21°–23°C and at a relative atmospheric humidity of about 70%. 10 Days after the inoculation, the infection of the seedlings is determined as a percentage of the untreated but also inoculated control plants.

0% Means no infection; 100% means that the infection is exactly as great as in the case of the control plants.

The active compounds, the concentrations of the active compounds and the results obtained can be seen from the following Table 8:

Table 8

| Active compound | *Podosphaera* test/Systemic Infection as a percentage of the infection of the untreated control with a concentration of active compound of 120 ppm |
|---|---|
| (A) [CH$_2$—NH—C(=S)—S / CH$_2$—NH—C(=S)—S]Zn (known) | 100 |
| (4) ⌬—NH—C(=S)—NH—COOC$_2$H$_5$ / NH—C(=O)—NH—CH$_2$—⌬ | 56 |
| (6) ⌬—NH—C(=S)—NH—COOC$_2$H$_5$ / NH—C(=O)—NH—CH$_2$—CH$_2$—O—CH$_3$ | 13 |

Table 8 — Continued

Podosphaera test/Systemic

| Active compound | Infection as a percentage of the infection of the untreated control with a concentration of active compound of 120 ppm |
|---|---|
| (1) phenyl–NH–C(=S)–NH–COOC$_2$H$_5$ / NH–C(=O)–NH–CH$_3$ | 12 |
| (2) phenyl–NH–C(=S)–NH–COOC$_2$H$_5$ / NH–C(=O)–NH–N(CH$_3$)$_2$ | 8 |
| (3) phenyl–NH–C(=S)–NH–COOC$_2$H$_5$ / NH–C(=O)–NH–(CH$_2$)$_5$–CN | 35 |

EXAMPLE 9

Fusicladium test (apple scab) [Curative]

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the four to six leaf stage are inoculated with an aqueous conidium suspension of the apple scab causative organism *Fusicladium dendriticum* Fuckel and incubated for 18 hours in a humidity chamber at 18°–20°C and at an atmospheric humidity of 100%. The plants are then placed in a greenhouse where they dry.

After standing for a suitable period of time, the plants are sprayed dripping wet with the spray liquid prepared in the manner described above. The plants are subsequently placed in a greenhouse.

15 Days after inoculation, the infestation of the apple seedlings is determined as a percentage of the untreated but also inoculated control plants.

0% Means no infestation; 100% means that the infestation is exactly as great as in the case of the control plants.

The active compounds, the concentrations of the active compounds, the period of time between inoculation and spraying and the results obtained can be seen from the following Table 9:

Table 9

| Active compound | Fusicladium test/Curative Residence period of 42 hours | Infection as a percentage of the infection of the untreated control with a concentration of active compound of 0.1% |
|---|---|---|
| (A) CH$_2$–NH–C(=S)–S\ / CH$_2$–NH–C(=S)–S/ Zn (known) | | 75 |
| (4) phenyl–NH–C(=S)–NH–COOC$_2$H$_5$ / NH–C(=O)–NH–CH$_2$–phenyl | | 5 |

Table 9 – Continued

| Active compound | *Fusicladium* test/Curative Residence period of 42 hours | Infection as a percentage of the infection of the untreated control with a concentration of active compound of 0.1% |
|---|---|---|
| (5) phenyl–NH–C(=S)–NH–COOC$_2$H$_5$ ; phenyl–NH–C(=O)–NH–phenyl | | 6 |
| (6) phenyl–NH–C(=S)–NH–COOC$_2$H$_5$ ; phenyl–NH–C(=O)–NH–CH$_2$–CH$_2$–O–CH$_3$ | | 0 |
| (1) phenyl–NH–C(=S)–NH–COOC$_2$H$_5$ ; phenyl–NH–C(=O)–NH–CH$_3$ | | 3 |
| (2) phenyl–NH–C(=S)–NH–COOC$_2$H$_5$ ; phenyl–NH–C(=O)–NH–N(CH$_3$)$_2$ | | 3 |
| (3) phenyl–NH–C(=S)–NH–COOC$_2$H$_5$ ; phenyl–NH–C(=O)–NH–(CH$_2$)$_3$–CN | | 5 |

EXAMPLE 10

Fusicladium test (systemic)

Solvent: 4.7 parts by weight acetone
Emulsifier: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the three to four leaf stage, watered once in 1 week with 20 cc of the liquid to be used for watering, in the stated concentration of active compound, with reference to 100 cc of soil. The plants so treated are, after the treatment, inoculated with an aqueous conidium suspension of *Fusicladium dendriticum* Fuckel and incubated for 18 hours in a humidity chamber at 18°–20°C and at a relative atmospheric humidity of 100%. The plants are subsequently placed in a greenhouse for 14 days.

15 Days after inoculation, the infection of the seedlings is determined as a percentage of the untreated but also inoculated control plants. 0% Means no infection; 100% means that the infection is exactly as great as in the case of the control plants.

The active compounds, the concentrations of the active compounds and the results obtained can be seen from the following Table 10:

Table 10

| Active compound | *Fusicladium* test/systemic Infection as a percentage of the infection of the untreated control with a concentration of active compound of 120 ppm |
|---|---|
| (A) [CH$_2$–NH–C(=S)–S ; CH$_2$–NH–C(=S)–S]Zn (known) | 100 |

Table 10 – Continued

| | Active compound | *Fusicladium* test/systemic<br>Infection as a percentage of the infection of the untreated control with a concentration of active compound of<br>120 ppm |
|---|---|---|
| (4) | ⌬–NH–C(=S)–NH–COOC₂H₅<br>⌬–NH–C(=O)–NH–CH₂–⌬ | 90 |
| (5) | ⌬–NH–C(=S)–NH–COOC₂H₅<br>⌬–NH–C(=O)–NH–⌬ | 88 |
| (6) | ⌬–NH–C(=S)–NH–COOC₂H₅<br>⌬–NH–C(=O)–NH–CH₂–CH₂–O–CH₃ | 0 |
| (1) | ⌬–NH–C(=S)–NH–COOC₂H₅<br>⌬–NH–C(=O)–NH–CH₃ | 86 |
| (2) | ⌬–NH–C(=S)–NH–COOC₂H₅<br>⌬–NH–C(=O)–NH–N(CH₃)₂ | 17 |
| (3) | ⌬–NH–C(=S)–NH–COOC₂H₅<br>⌬–NH–C(=O)–NH–(CH₂)₃–CN | 67 |

The following Examples are set forth to illustrate, without limitation, the process for producing the compounds of the present invention.

Example 11

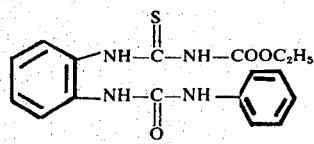

(5)

45.4 (0.2 mole) N-2 aminophenyl-N'-phenylurea in 200 cc dry chloroform are provided. 26.2 g (0.2 mole) ethoxycarbonyl isothiocyanate are added dropwise, the temperature being kept at 30°C by cooling with ice. After further stirring for one hour, suction filtration is effected. Yield: 68 g (96% of theory) N-[2-(phenylureido)-phenyl]-N'-ethoxycarbonylthiourea which can be purified by recrystallization from acetonitrile/dimethylformamide; the melting point of the pure compound is 172°–175°C (with decomposition). In analogous manner, the following compounds were obtained:

| | Formula | Melting point (°C) |
|---|---|---|
| (4) | ⌬–NH–C(=S)–NH–COOC₂H₅<br>⌬–NH–C(=O)–NH–CH₂–⌬ | 176 – 9 (Decomp.) |
| (6) | ⌬–NH–C(=S)–NH–COOC₂H₅<br>⌬–NH–C(=O)–NH–CH₂–CH₂–O–CH₃ | 172 – 5 (Decomp.) |

-Continued

| | Formula | Melting point (°C) |
|---|---|---|
| (1) | 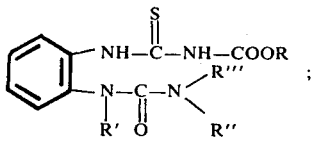 | 182 (Decomp.) |
| (2) | | 182 (Decomp.) |
| (3) | | 148 (Decomp.) |

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. A urediophenyl thiourea of the formula:

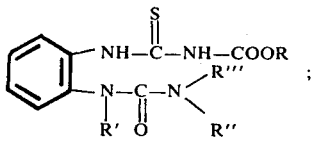

in which
   R stands for alkyl with 1–12 carbon atoms,
   R' and R'' each stands independently for a hydrogen atom or alkyl with 1–4 carbon atoms, and
   R''' stands for benzyl, phenyl, p-tolyl or p-methoxyphenyl.

2. A urea according to claim 1 in which R stands for methyl, ethyl or propyl; R' and R'' each stands independently for hydrogen, methyl or ethyl.

3. A urea according to claim 1 in which R stands for ethyl; R' and R'' each stands independently for hydrogen or methyl; and R''' stands for phenyl or benzyl.

4. Compound according to claim 1 wherein such compound is N-[2-(phenylureido)-phenyl]-N'-ethoxycarbonyl-thiourea of the formula

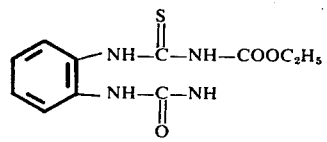

5. Compound according to claim 1 wherein such compound is N-[2-(benzylureido)-phenyl]-N'-ethoxycarbonyl-thiourea of the formula

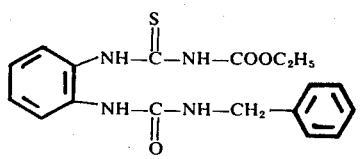

* * * * *